US009145307B2

(12) United States Patent
Tai et al.

(10) Patent No.: US 9,145,307 B2
(45) Date of Patent: Sep. 29, 2015

(54) WATER RESOURCE TREATING DEVICE (75) Inventors: Chang-Hsien Tai, Pingtung (TW);
Geng-Ren Liu, Pingtung (TW);
Uzu-Kuei Hsu, Pingtung (TW)

(73) Assignee: National Pingtung University of Science & Technology, Pingtung County (TW)

( * ) Notice: Subject to any disclaimer, the term of this patent is extended or adjusted under 35 U.S.C. 154(b) by 541 days.

(21) Appl. No.: 13/572,994

(22) Filed: Aug. 13, 2012

(65) Prior Publication Data

US 2013/0256116 A1    Oct. 3, 2013

(30) Foreign Application Priority Data

Mar. 29, 2012   (TW) .............................. 101111093 A (51) Int. Cl.
C02F 1/04    (2006.01)
B01D 3/06    (2006.01)
C02F 1/06    (2006.01)
B01D 1/00    (2006.01)
B01D 1/06    (2006.01)
B01D 5/00    (2006.01)

(52) U.S. Cl.
CPC .............. *C02F 1/048* (2013.01); *B01D 1/0041* (2013.01); *B01D 1/0082* (2013.01); *B01D 1/06* (2013.01); *B01D 3/06* (2013.01); *B01D 5/0006* (2013.01); *C02F 1/04* (2013.01); *C02F 1/06* (2013.01)

(58) Field of Classification Search
None
See application file for complete search history.

(56) References Cited

U.S. PATENT DOCUMENTS

| 3,334,026 | A  | * | 8/1967  | Dobell     | 203/10   |
| 3,930,960 | A  | * | 1/1976  | Taylor     | 202/185.6 |
| 4,289,118 | A  | * | 9/1981  | Stark      | 126/577  |
| 6,303,006 | B1 | * | 10/2001 | Chang et al. | 203/1  |
| 2011/0266132 | A1 | * | 11/2011 | Takezaki | 202/233 |

FOREIGN PATENT DOCUMENTS

TW          M303203       12/2006

* cited by examiner

*Primary Examiner* — In Suk Bullock
*Assistant Examiner* — Elizabeth Cardin
(74) *Attorney, Agent, or Firm* — Muncy, Geissler, Olds & Lowe, P.C.

(57) ABSTRACT

A water resource treating device includes an inner tube having a wind inlet section, a front low-pressure section, and a buffering section in series. The front low-pressure section has an inner diameter smaller than an inner diameter of the buffering section. An outer tube is mounted around the inner tube. A flash space is defined between the inner and outer tubes. The outer tube includes a water filling hole and a draining hole both of which is in communication with the flash space. A condensing tank is mounted in the flash space and surrounds the front low-pressure section. The condensing tank is connected to the flash space by a water inlet tube. A water outlet tube is connected to the condensing tank for draining purified water in the condensing tank. A regulator is mounted in the front low-pressure section and controls communication between the inner tube and the condensing tank.

12 Claims, 6 Drawing Sheets

WATER RESOURCE TREATING DEVICE

BACKGROUND OF THE INVENTION

1. Field of the Invention

The present invention relates to a water resource treating device and, more particularly, to a water resource treating device for purifying water by removing impurities in the water in a low temperature/low pressure environment.

2. Description of the Related Art

Conventionally, distillation is generally used to separate an easy-to-evaporate liquid from nonvolatile substances, such as seawater desalination or wastewater treatment.

Figure 1:
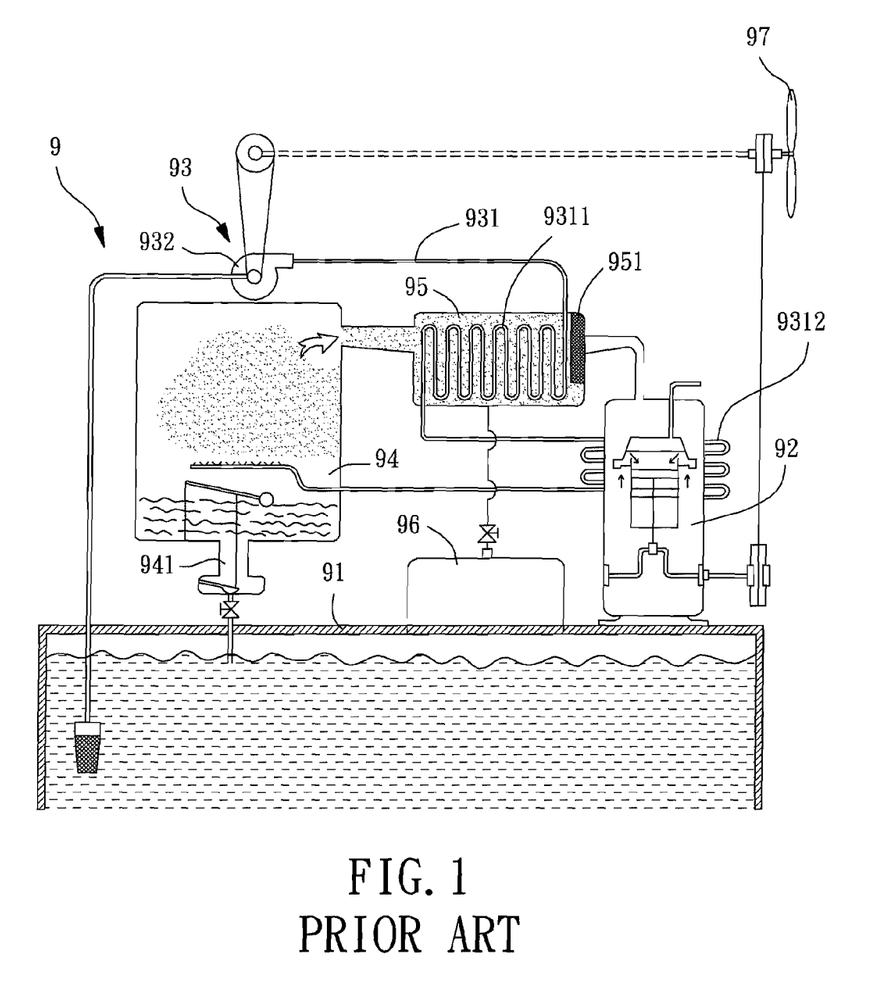
FIG. 1 shows a schematic diagram of a conventional seawater desalination device.

Taking seawater desalination as an example, multi-stage flashing, vapor compression, multi-effect distillation, and reverse osmosis are used to separate seawater into fresh water with a low salt content and brine with a high salt content. FIG. 1 shows a seawater distillation device 9 including a base 91 on which a vacuum pump 92, a water pump unit 93, a vacuum chamber 94, a condensing chamber 95 and a water tank 96 are mounted. The vacuum pump 92 is driven by a windmill 97. The water pump unit 93 includes a suction pipe 931 and a water pump 932. An end of the suction pipe 931 is in the seawater and serves as a suction end. The other end of the suction pipe 931 serves as a vaporizing end. A middle section of the suction pipe 931 includes a first heat-absorbing coil 9311 and a second heat-absorbing coil 9312 wound around the vacuum pump 92. The vacuum chamber 94 receives the vaporizing end of the suction pipe 93. A draining hole 941 is formed in a bottom of the vacuum chamber 94. The condensing chamber 95 receives the first heat-absorbing coil 9311 of the suction pipe 931 and is in communication with the vacuum pump 92 and the vacuum chamber 94. An end of the condensing chamber 95 connected to the vacuum pump 92 serves as an output end in which a filtering net 951 is mounted. A bottom of the condensing chamber 95 is in communication with the water tank 96. An example of such a seawater distillation device 9 is disclosed in Taiwan Utility Model No. M303302.

By sucking seawater through the water pump 932, seawater passes through the suction end to the vaporizing end of the suction pipe 931. Through operation of the vacuum pump 92, each of the condensing chamber 95 and the vacuum chamber 94 forms a low pressure environment to force the seawater preheated by the first and second heat absorbing coils 9311 and 9312 to eject from the vaporizing end of the suction pipe 931. Then, the seawater turns into water vapor with a low salt content through flashing. The water vapor enters the condensing chamber 95 and condenses into fresh water that is stored in the water tank 96. Furthermore, the brine with a high salt content accumulated in the bottom of the vacuum chamber 94 is duly drained via the draining hole 941.

However, a temperature difference is required in the conventional seawater distillation process to achieve the condensation of the water vapor after evapotranspiration of the seawater. Namely, a heat source is required to maintain the temperature difference for continuous flashing of the seawater and subsequent condensation into fresh water. However, the heat source will cause additional energy loss and an increase in the costs. Even though the windmill 97 using the natural wind power is cheaper than conventional electrical devices driven by electricity, operation of the vacuum pump 92 is far less stable than the electrical devices. Thus, the vacuum chamber 94 and the condensing chamber 95 can not maintain the required low pressure environment. As a result, seawater can not easily flash in the vacuum chamber 94. It is not easy to condense a large amount of seawater into fresh water by simply relying on the waste heat of the vacuum pump 92 and the condensing heat of the seawater, leading to low efficiency of seawater desalination.

Thus, a need exists for a novel water resource treating device for seawater desalination or wastewater treatment to continuously proceed with water purification in a stable low temperature/low pressure environment without the above disadvantages.

SUMMARY OF THE INVENTION

An objective of the present invention is to provide a water resource treating device that provides a low temperature/low pressure environment allowing an easy-to-evaporate liquid to flash distill while consuming less energy, removing the impurities in the water and, hence, purifying the water.

Another objective of the present invention is to provide a water resource treating device that can flash distill and condense a large amount of an easy-to-evaporate liquid at a normal temperature, saving the energy loss resulting from external heating, enhancing the water resource treating efficiency and cutting the costs for treating.

The present invention fulfills the above objectives by providing a water resource treating device including an inner tube having a wind inlet section, a front low-pressure section, and a buffering section. The front low-pressure section is located between the wind inlet section and the buffering section. The front low-pressure section has an inner diameter smaller than an inner diameter of the buffering section. An outer tube is mounted around the inner tube. A flash space is defined between the inner tube and the outer tube. The outer tube includes a water filling hole and a draining hole, with each of the water filling hole and the draining hole being in communication with the flash space. A condensing tank is mounted in the flash space and surrounds the front low-pressure section of the inner tube. The condensing tank is connected to the flash space by a water inlet tube. A water outlet tube is connected to the condensing tank. The water outlet tube is adapted for draining purified water in the condensing tank. A regulator is mounted in the front low-pressure section of the inner tube and controls communication between the inner tube and the condensing tank.

Preferably, the inner tube includes a plurality of heat conductive members spaced from each other and extending through the inner tube. The plurality of heat conductive members is distributed in the front low-pressure section and extends in the condensing tank.

Preferably, the inner tube includes an airflow exchange hole extending from an inner periphery of the inner tube through an outer periphery of the inner tube. The airflow exchange hole is located in the front low-pressure section. The airflow exchange hole allows for exchange of airflow in the inner tube with airflow in the condensing tank.

Preferably, the regulator is mounted in the inner periphery of the inner tube and aligned with the airflow exchange hole. The regulator includes an abutting portion and a resilient portion. The resilient portion abuts a side of the abutting portion. The other side of the abutting portion abuts a peripheral wall delimiting the airflow exchange hole.

Preferably, the buffering section of the inner tube includes a high pressure section, a buffering low-pressure section, and a wind outlet section. The buffering low-pressure section has an inner diameter smaller than an inner diameter of the high pressure section and smaller than an inner diameter of the wind outlet section.

Preferably, a generator is mounted in the buffering low-pressure section of the inner tube.

Preferably, the outer tube includes an end connected to the wind inlet section of the inner tube. The other end of the outer tube is connected to the wind outlet section, with the flash space defined between the end and the other end of the outer tube.

Preferably, an area ratio of the wind inlet section to the front low-pressure section is 20:1. An area ratio of the buffering section to the front low-pressure section is 20:1.

Preferably, the draining hole is located in an interconnection between the outer tube and the wind outlet section of the inner tube.

Preferably, the condensing tank includes a water condensing space, at least one inlet hole and at least one outlet hole. Each of the at least one inlet hole and the at least one outlet hole is in communication with the water condensing space. The at least one inlet hole guides water vapor obtained from flashing in the flash space into the water condensing space. The at least one outlet hole guides condensed water obtained from condensation of water vapor in the water condensing space out of the condensing tank.

Preferably, the water inlet tube includes a first end connected to the at least one inlet hole and a second end in communication with the flash space. The water outlet tube includes a first end connected to the at least one outlet hole and a second end in communication with outside.

Preferably, a filtering net is mounted in the second end of the water inlet tube.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

A water resource treating device according to the present invention is suitable for seawater desalination and purification of wastewater from various industries, aquaculture, animal husbandry, agriculture, and forestry. The water resource treating device can effectively purify and reuse the water resources in the demands of livelihood water supply, public water supply, irrigation water, and industrial water, mitigating and solving the problems of supply and demand imbalance and even shortage of water resources.

Figure 2:
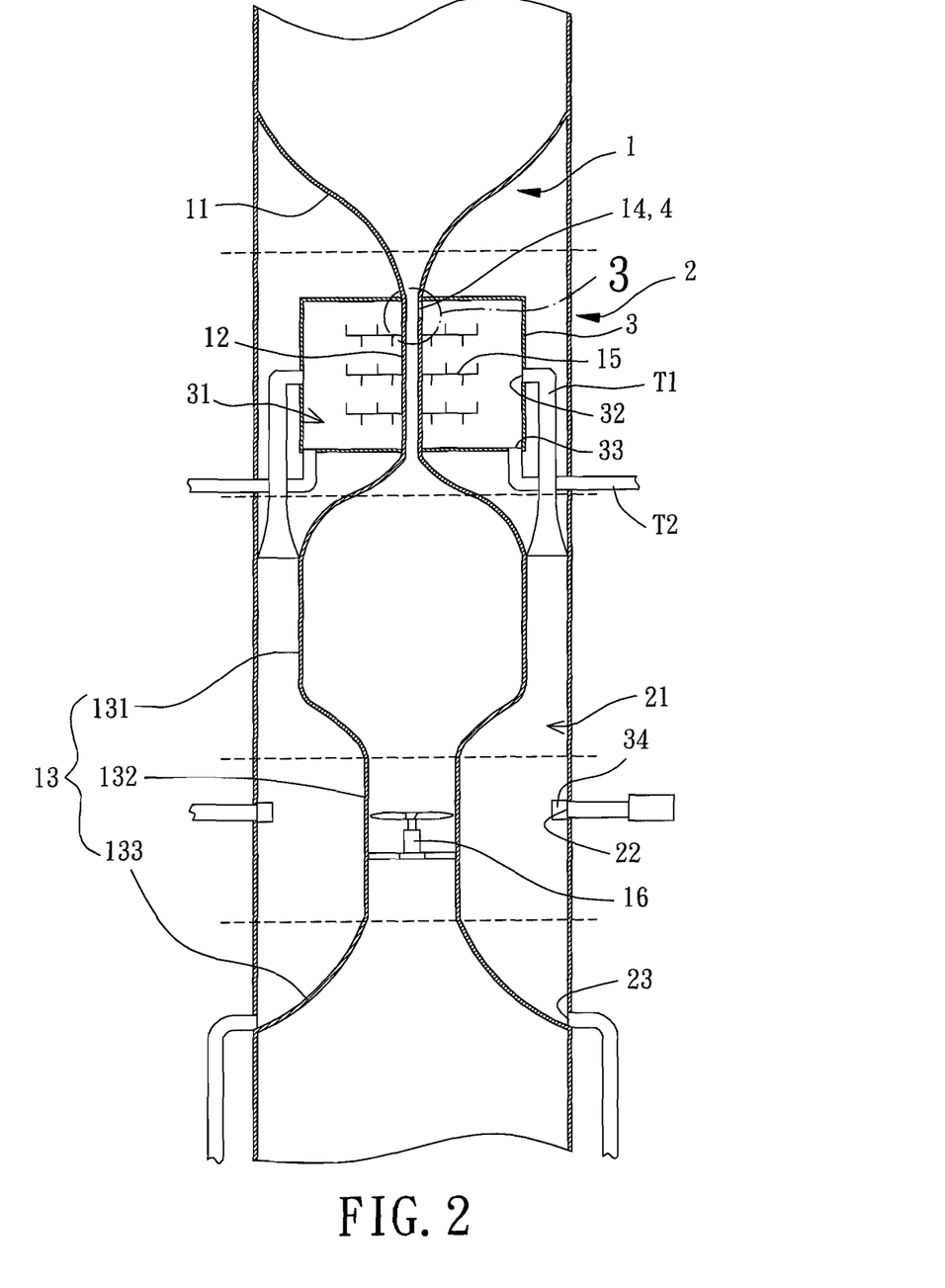
FIG. 2 shows a schematic cross sectional view of a water resource treating device according to the present invention.

FIG. 2 shows an embodiment of the water resource treating device according to the present invention including an inner tube 1, an outer tube 2, a condensing tank 3 and a regulator 4. The outer tube 2 is mounted around the inner tube 1. The condensing tank 3 is mounted between the inner and outer tubes 1 and 2. The regulator 4 is mounted to an inner periphery of a section of the inner tube 1 surrounded by the condensing tank 3. The regulator 4 controls communication between the condensing tank 3 and the inner tube 1.

The inner tube 1 includes a wind inlet section 11, a front low-pressure section 12 and a buffering section 13 in series, with the front low-pressure section 12 located between the wind inlet section 11 and the buffering section 13. The front low-pressure section 12 is in the form of a neck extending from the wind inlet section 11 to the buffering section 13. Namely, the front low-pressure section 12 has an inner diameter smaller than inner diameters of the wind inlet section 11 and the buffering section 13. The neck-shaped front low-pressure section 12 between the wind inlet section 11 and the buffering section 13 creates a pressure difference between the front low-pressure section 12 and the wind inlet section 11 and between the front low-pressure section 12 and the buffering section 13, increasing the speed of the airflow flowing through the front low-pressure section 12 while maintaining the airflow in a low temperature/low pressure state. The area ratio of the wind inlet section 11 to the front low-pressure section 12 is 20:1. The area ratio of the buffering section 13 to the front low-pressure section 12 is 20:1. In this embodiment, the inner tube 1 further includes an airflow exchange hole 14 extending from the inner periphery through an outer periphery of the inner tube 1. The airflow exchange hole 14 is located in the front low-pressure section 12 to allow exchange the airflow in the inner tube 1 with the airflow in the condensing tank 3, achieving a pressure balance (particularly a low pressure balance) between the inner tube 1 and the condensing tank 3.

The inner tube 1 can further include a plurality of heat conductive members 15 such as metal plates or like material capable of conducting heat. In this embodiment, the heat conductive members 15 are spaced from each other and extend through the inner tube 1. The heat conductive members 15 are located in the front low-pressure section 12 and extend in the condensing tank 3. Thus, the temperature of water vapor in the condensing tank 3 drops, and the water vapor condenses into water in the condensing tank 3 through heat exchange between the condensing tank 3 and the inner tube 1 by the heat conductive members 15.

In addition, the buffering section 13 of the inner tube 1 can be divided into a high pressure section 131, a buffering low-pressure section 132 and a wind outlet section 133. The buffering low-pressure section 132 is in the form of a neck between the high pressure section 131 and the wind outlet section 133. Namely, the buffering low-pressure section 132 has an inner diameter smaller than the inner diameters of the high pressure section 131 and the wind outlet section 133. The neck-shaped buffering low-pressure section 132 between the high pressure section 131 and the wind outlet section 133 increases the speed of the airflow flowing through the buffering low-pressure section 132. The inner tube 1 can further include a generator 16 that can be a wind power generator driven by the airflow. In this embodment, the generator 16 is mounted in the buffering low-pressure section 132 of the inner tube 1 and can be driven by high-speed airflow to generate electricity.

The outer tube 2 is mounted around the inner tube 1. A flash space 21 is defined between the inner tube 1 and the outer tube 2 for receiving an easy-to-evaporate liquid. An end of the outer tube 2 is connected to the wind inlet section 11 of the inner tube 2. The other end of the outer tube 2 is connected to the buffering section 13 of the inner tube 1, particularly at the wind outlet section 133 of the inner tube 1. The flash space 21 is defined between the ends of the outer tube 2. The outer tube 2 includes at least one water filling hole 22 and at least one draining hole 23 both of which are in communication with the flash space 21. In this embodiment, the outer tube 2 includes two water filling holes 22 and two draining holes 23. Preferably, each water draining hole 23 is located in an interconnection between the outer tube 2 and the wind outlet section 133 for draining brine with a high salt content. The water filling holes 22 can be connected to a water level controller, such as a water level controlling mechanism in a water tank of a toilet, to control the seawater level in the flash space 21 such that seawater can be duly guided into the flash space 21 via the water filling holes 22, which can be appreciated by one skilled in the art.

The condensing tank 3 is mounted in the flash space 21 and surrounds the front low-pressure section 12 of the inner tube 2. The condensing tank 3 is located between the wind inlet section 11 and the high pressure section 131 of the inner tube 1 and is extended through by the front low-pressure section 12, with the heat conductive members 15 distributed in the condensing tank 3, as shown in FIG. 2. In this embodiment, two water inlet tubes T1 are connected to the condensing tank 3 and in communication with the flash space 21. Two water outlet tubes T2 are connected to the condensing tank 3 and in communication with the flash space 21 for draining purified water. The condensing tank 3 includes a water condensing space 31, at least one inlet hole 32, and at least one outlet hole 33. The at least one inlet hole 32 and the at least one outlet hole 33 are in communication with the water condensing space 31. In this embodiment, the condensing tank 3 includes two inlet holes 32 and two outlet holes 33. Water vapor obtained through flashing in the flash space 21 is guided into the water condensing space 31. Water obtained by condensation in the condensing tank 3 is guided out of the condensing tank 3 by the outlet holes 33. An end of each water inlet tube T1 is connected to one of the inlet holes 32, and the other end of each water inlet tube T1 is a free end in communication with the flash space 21. An end of each water outlet tube T2 is connected to one of the outlet holes 33, and the other end of each water outlet tube T2 is a free end in communication with the outside or a water tank.

In a case that the water resource to be treated is wastewater from industries, aquaculture or animal husbandry or from irrigation water of agriculture and forestry, a filtering net 34 can be provided to remove the impurities in the water. The filtering net 34 is located in the flash space 21 and mounted to the water filling hole 22. The mesh size of the filtering net 34 can be adjusted according to the impurities in the water resource to be treated, assuring effective removal of the impurities.

Figure 3:
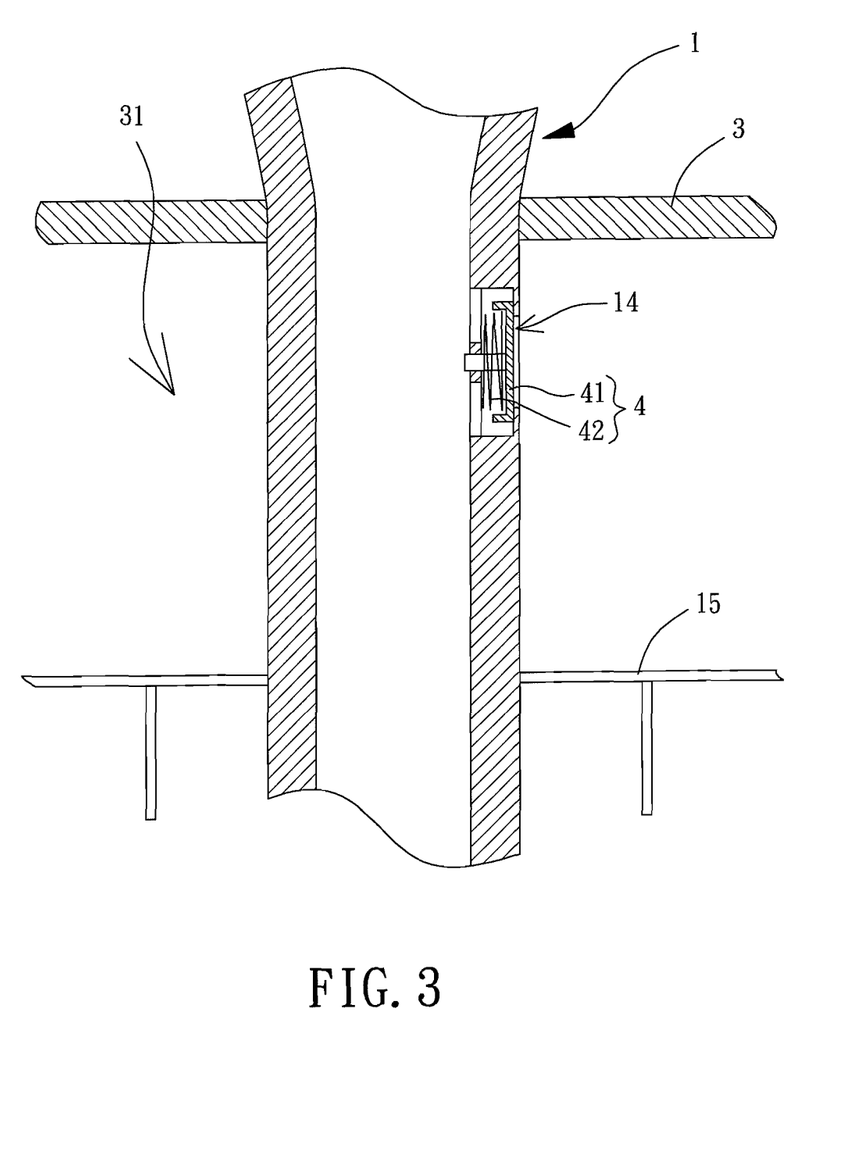
FIG. 3 shows an enlarged view of the water resource treating device of FIG. 2.
Figure 4:
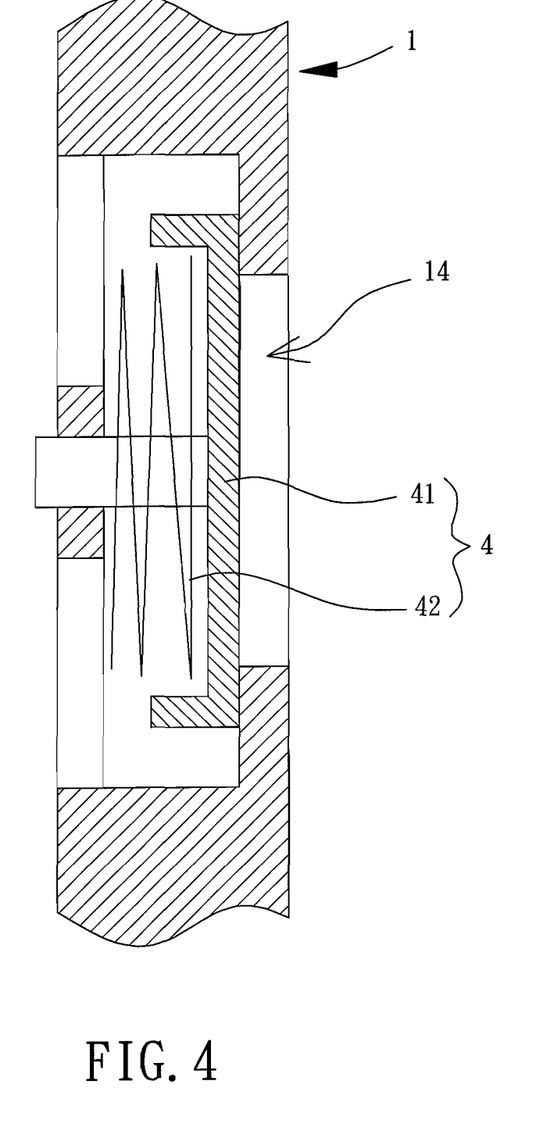
FIG. 4 shows an enlarged view of a circled portion of the water resource treating device of FIG. 2.

The regulator 4 is mounted in the front low-pressure section 12 to control communication between the inner tube 1 and the condensing tank 3. With reference to FIGS. 2 and 3, the regulator 4 is mounted to the inner periphery of the inner tube 1 and aligned with the airflow exchange hole 14 to control opening of the airflow exchange hole 14. The regulator 4 can be in the form of a single direction valve or a check valve. In this embodiment, the regulator 4 includes an abutment portion 41 and a resilient portion 42, as shown in FIG. 4. The resilient portion 42 abuts a side of the abutment portion 41. The other side of the abutment portion 41 abuts a peripheral wall delimiting the airflow exchange hole 14. The resilient portion 42 moves the abutment portion 41 towards or away from the airflow exchange hole 14. A pressure balance between the inner tube 1 and the condensing tank 3 can be achieved by using the regulator 4. However, regulators 4 of other forms and types can be used to achieve the pressure balance between the inner tube 1 and the condensing tank 3.

Figure 5:
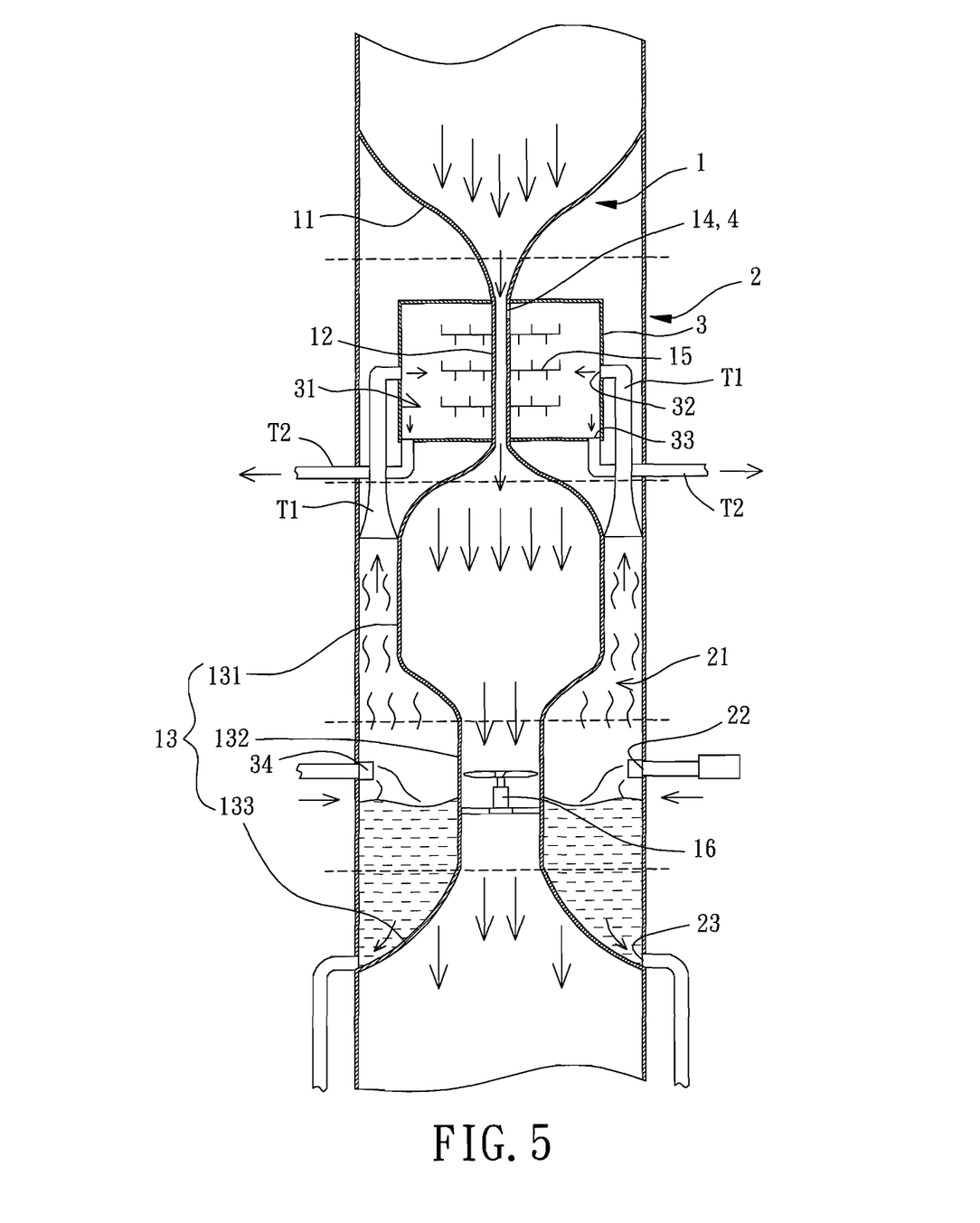
FIG. 5 shows a cross sectional view of the water resource treating device of FIG. 2, illustrating operation of the water resource treating device.

With reference to FIG. 5, in use of the water resource treating device according to the present invention to purify water by removing impurities in the water, the water resource to be treated is guided into the flash space 21 via the water filling holes 22.

Figure 6:
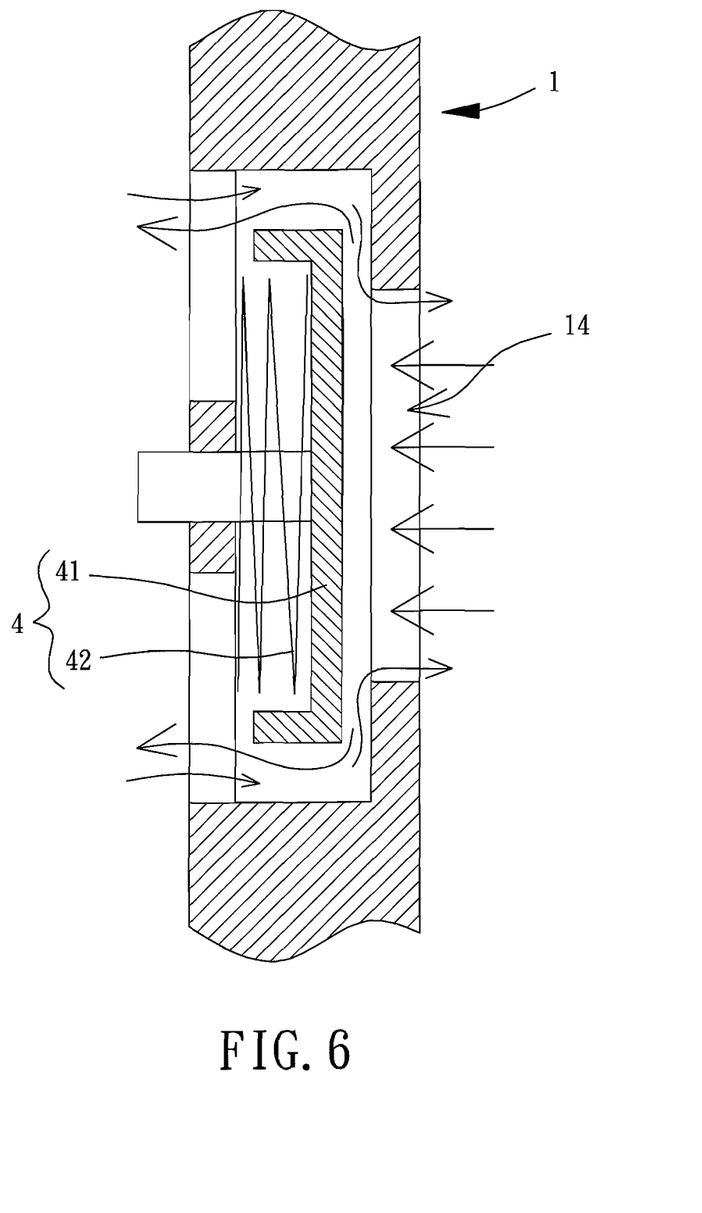
FIG. 6 shows a view similar to FIG. 4, illustrating operation of the water resource treating device.

Taking seawater desalination as an example, after the seawater is guided into the flash space 21, wind is passed through the inner tube 1, and the airflow flows from the wind inlet section 11 to the front low-pressure section 12. The speed of the airflow passing through the front low-pressure section 12 is increased due to the large pressure difference between the high pressure section 131 and the front low-pressure section 12 having a smaller diameter. The airflow rapidly passes through the front low-pressure section 12 is in a low temperature/low pressure state. The pressure in the condensing tank 3 is larger than that in the inner tube 1. With reference to FIG. 6, the regulator 4 moves towards an interior of the inner tube 1 under the action of the pressure difference, causing movement of the abutment portion 41 and opening of the airflow exchange hole 14. Thus, a pressure balance between the inner tube 1 and the condensing tank 3 is achieved through exchange of the airflows in the inner tube 1 and the condensing tank 3, maintaining a relatively low pressure environment in the condensing tank 3. As the condensing tank 3 provides the low pressure environment, the flash space 21 is also a low pressure environment through the water inlet tubes T1 in communication with the flash space 21. In this case, the evapotranspiration temperature of the seawater in the flash space 21 is reduced, allowing instantaneous flashing in the low pressure environment and producing a large amount of water vapor having an extremely low salt content.

With reference to FIG. 5, the water vapor in the flash space 21 enters the water condensing space 31 of the condensing tank 3 via the water inlet tubes T1. At this time, since the heat conductive members 15 are in a low temperature state, the water vapor entering the condensing tank 3 condenses into water under the low temperature action. The condensed water is guided outside via the outlet holes 33 and the outlet tubes T2 into the water tank. Furthermore, the brine with a high salt content remaining in the flash space 21 after flashing can be drained via the draining holes 23, completing seawater desalination and obtaining fresh water.

Furthermore, when the airflow flows through the high pressure section 131 to the buffering low-pressure section 132, since the buffering low-pressure section 132 between the high pressure section 131 and the wind outlet section 133 having a smaller diameter, the speed of the airflow is increased. The airflow drives the generator 16 to produce electricity, effectively using the energy.

In view of the foregoing, the primary features of the water resource treating device according to the present invention are that by changing the inner diameters of the inner tube 1 in different sections, the speed of the airflow flowing in the inner tube 1 is changed according to the temperature and pressure in the different sections. Thus, the airflow flowing through the front low-pressure section 12 is in a low temperature/low pressure state due to an increase in the speed, and each of the condensing tank 3 and the flash space 21 is turned into a low temperature/low pressure environment through provision of the regulator 4 and the heat conductive members 15. Thus, the easy-to-evaporate liquid in the flash space 21 can stably flash in the stable low temperature/low pressure environment to avoid energy loss resulting from conventional heating, reducing the operational costs. Furthermore, the water vapor with a low salt content obtained from rapid flashing in the flash space 21 can enter the water condensing space 31 via the water inlet tubes T1 and condenses into water due to the low temperature environment provided by the water condensing space 31 or due to contact with the low-temperature heat conductive members 15. Desalination or removal of impurities of the water resource is effectively accomplished, enhancing the water resource treating efficiency and obtaining purified water resource.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A water resource treating device comprising:
an inner tube including a wind inlet section, a front low-pressure section and a buffering section, with the front low-pressure section located between the wind inlet section and the buffering section, with the front low pressure section having an inner diameter smaller than an inner diameter of the buffering section;
an outer tube mounted around the inner tube, with as flash space defined between the inner tube and the outer tube, with the outer tube including a water filling hole and a draining hole, with each the water filling hole and the draining hole being in communication with the flash space;
a condensation tank mounted in the flash space and surrounding the front low-pressure section of the inner tube, with the condensing tank connected to the flash space by a water inlet tube, with a water outlet tube connected to the condensing tank, with the water outlet tube adapted for draining purified water in the condensing tank; and
a regulator mounted in the front low pressure section of the inner tube, with the regulator controlling communication between the inner tube and condensing tank, wherein
the inner tube includes an airflow exchange hole extending from an inner periphery of the inner tube through an outer periphery of the inner tube, and the airflow exchange hole is located in the front low-pressure section and allows exchange of airflow in the inner tube with airflow in the condensing tank.

2. The water resource treating device as claimed in claim 1, wherein the inner tube includes a plurality of heat conductive members spaced from each other and extending through the inner tube, and the plurality of heat conductive members is distributed in the front low-pressure section and extends in the condensing tank.

3. The water resource treating device as claimed in claim 1, wherein the regulator is mounted in the inner periphery of the inner tube and aligned with the airflow exchange hole, the regulator includes an abutting portion and a resilient portion, the resilient portion abuts a side of the abutting portion, and the abutting portion has an other side abutting a peripheral wall delimiting the airflow exchange hole.

4. The water resource treating device as claimed in claim 1, wherein, the buffering section of the inner tube includes a high pressure section, a buffering low-pressure section and a wind outlet section, and the buffering low-pressure section has an inner diameter smaller than an inner diameter of the high pressure section and smaller than an inner diameter of the wind outlet section.

5. The water resource treating device as claimed in claim 4, further comprising: a generator mounted in the buffering low-pressure section of the inner tube.

6. The water resource treating device as claimed in claim 4, wherein the outer tube includes an end connected to the wind inlet section of the inner tube and an other end connected to the wind outlet section, and the flash space is defined between the end and the other end of the outer tube.

7. The water resource treating device as claimed in claim 1, wherein an area ratio of the wind inlet section to the front low-pressure section being 20:1.

8. The water resource treating device as claimed in claim 1, wherein an area ratio of the buffering section to the front low-pressure section being 20:1.

9. The water resource treating device as claimed in claim 4, wherein the draining hole is located in an interconnection between the outer tube and the wind outlet section of the inner tube.

10. The water resource treating device as claimed in claim 1, wherein the condensing tank includes a water condensing space, at least one inlet hole and at least one outlet hole, each of the at least one inlet hole and the at least one outlet hole is in communication with the water condensing space, the at least one inlet hole guides water vapor obtained from flashing in the flash space into the water condensing space, and the at least one outlet hole guides condensed water obtained from condensation of water vapor in the water condensing space out of the condensing tank.

11. The water resource treating device as claimed in claim 10, wherein the water inlet tube includes a first end connected to the at least one inlet hole and a second end in communication with the flash space, and the water outlet tube includes a first end connected to the at least one outlet hole and a second end in communication with outside.

12. The water resource treating device as claimed in claim 11, further comprising: a filtering net mounted in the second end of the water inlet tube.

* * * * *